United States Patent [19]

Hiraiwa et al.

[11] Patent Number: 5,633,084
[45] Date of Patent: May 27, 1997

[54] COATED FUSED ALUMINA PARTICLES AND PRODUCTION PROCESS THEREOF

[75] Inventors: Tadashi Hiraiwa; Fumiyoshi Ono, both of Shiojiri, Japan

[73] Assignee: Showa Denko K.K., Tokyo, Japan

[21] Appl. No.: 233,897

[22] Filed: Apr. 28, 1994

[30] Foreign Application Priority Data

Apr. 28, 1993 [JP] Japan .................................. 5-103224
Sep. 24, 1993 [JP] Japan .................................. 5-238413

[51] Int. Cl.$^6$ .............................. B32B 5/16; B24D 3/02; C04B 35/44
[52] U.S. Cl. .......................... 428/403; 51/309; 428/404; 428/700; 428/701; 501/118; 501/119; 501/120; 501/127; 501/136; 501/153
[58] Field of Search .................................. 428/403, 404, 428/699, 700, 701, 702; 51/295, 297, 307, 309; 501/108, 118, 119, 120, 127, 134, 136, 153

[56] References Cited

U.S. PATENT DOCUMENTS

| 3,437,468 | 4/1969 | Seufert ................................ 75/235 |
|---|---|---|
| 4,483,944 | 11/1984 | Day et al. ............................. 502/439 |
| 5,114,891 | 5/1992 | Kunz et al. ........................... 501/127 |
| 5,145,719 | 9/1992 | Towata et al. ....................... 427/215 |
| 5,266,536 | 11/1993 | Egerton et al. ...................... 501/127 |
| 5,431,704 | 7/1995 | Tamamaki et al. .................... 51/309 |

FOREIGN PATENT DOCUMENTS

| 3911196 | 6/1939 | Japan . |
|---|---|---|
| 3925620 | 11/1939 | Japan . |
| 4014357 | 7/1940 | Japan . |
| 4016594 | 7/1940 | Japan . |
| 44637 | 1/1944 | Japan . |
| 44638 | 1/1944 | Japan . |

*Primary Examiner*—H. Thi Le
*Attorney, Agent, or Firm*—Sughrue, Mion, Zinn, Macpeak & Seas

[57] ABSTRACT

Fused alumina particles are covered with a coating of aluminum titanate which is formed by applying a Ti-containing compound to the surface of the fused alumina particles and firing the same to cause a reaction between the Ti-containing compound and the alumina.

13 Claims, No Drawings

COATED FUSED ALUMINA PARTICLES AND PRODUCTION PROCESS THEREOF

BACKGROUND OF THE INVENTION

1. Field of the Invention

The present invention relates to fused alumina particles coated with aluminum titanate, a process for producing the same, abrasive grits of the coated fused alumina particles, and a grinding wheel and coated abrasive using said abrasive grit.

2. Description of Related Art

As defined in JIS R6111-1987 for Artificial Abrasives, alumineous abrasives produced by fusing Baeyer alumina in an electric furnace include white alumineous abrasive (WA), pink alumineous abrasive (PA), monocrystalline alumineous abrasive (HA), and the like. The toughness of the abrasive is increased from WA to PA to HA (HA>PA>WA), but they still do not have suitable grinding qualities for tool steel or other hard materials. Thus, attempts have been made to coat the surface of the fused alumina with various additives to improve the grinding qualities thereof.

For example, JP-B-39-25620 discloses that a fused alumina abrasive grit is coated with 0.5 to 2.0% of an iron compound and heated to 700° to 950° C. to form a thin film of iron oxide on the abrasive grit. JP-B-40-16594 discloses that a fused alumina abrasive grit is coated with 0.01 to 1.0% of a chromium compound and heated at 800° to 1,400° C. to form a thin film of chromium oxide on the surface of the abrasive grit. JP-B-44-637 discloses that a fused alumina abrasive grit is coated with 0.2 to 2.0% of a copper compound and heated at 900° to 1,250° C. to form a thin film of copper oxide on the surface of the abrasive grit. JP-B-44-638 discloses that a fused alumina abrasive grit is coated with 0.2 to 2.0% of a nickel compound and heated at 800° to 1,000° C. to form a thin film of nickel oxide on the surface of the abrasive grit.

These coating layers are to remove micro defects of fused alumina particles which appear when the particles are crushed from ingot and do not essentially improve the grinding qualities of the abrasive grits.

Further, these coating layers physically cover the surface of the abrasive grit and can be easily peeled off. As a result, the grinding qualities of the abrasive grit are not improved.

JP-B-39-11196 discloses that a fused alumina is coated with colloidal alumina. JP-B-40-14357 discloses that a fused alumina is wetted with an organic adhesive solution, powders of refractory materials such as a $Fe_2O_3$—ZnO—MnO mixture, a $TiO_2$—$SiO_2$—ZnO mixture or $TiO_2$ are applied on the wetted fused alumina, and the fused alumina with the refractory powders is heated to fuse the refractory powders onto the surface of the fused alumina.

These coating layers are to improve the wetting of the abrasive grit with a binder during production of a grinding wheel, so that the toughness of the grinding wheel is improved. Thus, the abrasive grit itself is not essentially improved and an improvement in the grinding qualities of the abrasive grit is not attained.

SUMMARY OF THE INVENTION

The object of the present invention is to provide coated fused alumina particles which can be used as an abrasive material with excellent grinding qualities or as a refractory material with excellent thermal shock resistance. Particularly, the present invention is aimed at improving the bonding of the coating layer to the fused alumina, so as to prevent peeling and dropping of the coating layer, by chemically bonding the coating layer and the fused alumina and to improve the mechanical strength and toughness of the alumina particles.

The above object has been attained in accordance with the present invention by providing coated fused alumina particles in which fused alumina particles are covered with a coating layer comprising aluminum titanate as a major or component; abrasive grits made of the coated fused alumina particles; a grinding wheel and coated abrasive comprising the coated fused alumina particles; and a process for producing coated fused alumina particles, comprising the steps of applying a titanium-containing compound onto the surface of fused alumina particles, and heating the particles at a temperature of 1,200° C. or higher to form a coating layer comprising aluminum titanate as a major component on the surface of the fused alumina particles.

The fused alumina particles used in the present invention are electrically fused alumina particles, such as defined as brown alumina abrasive (A), white alumina abrasive (WA), pink alumina abrasive (PA) or monocrystalline alumina abrasive (HA) among the alumina particles defined in JIS R 6111-1987 for artificial abrasives. The particle size, qualities, etc. are not limited to those defined in JIS R 6111-1987.

First, the production of the coated fused alumina particles is described.

First, a titanium-containing compound is applied to the surface of fused alumina particles such as fused alumina abrasive grit.

The titanium-containing compound may be powders of titanium oxides such as rutile and anatase, titanates such as iron titanate, magnesium titanate, cobalt titanate, zinc titanate, manganese titanate and nickel titanate, water soluble titanium-containing compounds such as titanium tetrachloride, metatitanate and titanic acid, titanium alcoxides such as titanium isopropoxide and titanium butoxide.

The amount of the titanium-containing compound applied to the fused alumina particle is preferably 0.03 to 3.0 parts by weight as $TiO_2$ to 100 parts by weight of the fused alumina particles. If the amount of the titanium-containing compound applied is less than 0.03 part by weight, the aluminum titanate to be formed is too little to cover the entire surface of the fused alumina particles. If the amount of the titanium containing compound applied is higher than 3.0 parts by weight, the titanium content is too high so that aluminum titanate is formed but unreacted $TiO_2$ and the like remain, to thereby degradate the properties of the coating layer.

The applied titanium-containing compound substantially reacts with the alumina to form aluminum titanate and to form a coating layer on the surface of the fused alumina particles.

The coating layer on the surface of the fused alumina particles of the present invention comprises aluminum titanate as at least a major component. The coating layer may contain other alumina compounds which may be formed by a reaction between alumina of the fused alumina particles and the titanium-containing compound. Preferable alumina compounds include various spinels formed from alumina and oxides of divalent metals such as Fe, Mg, Co, Zn, Mn and Ni. It is however more preferable that the surface coating layer consists of aluminum titanate.

The method of applying the titanium-containing compound to the fused alumina particles is described below.

In the case where powders of titanium oxide, titanate or the like are adequate to apply onto the surface of the alumina particles, the admixture of said powders with the alumina particles may be sufficient. If such a simple admixture is not sufficient and the powders are not put onto and are separated from the alumina particles, the alumina particles may be first wetted with a liquid such as water in an amount of 5 to 20% by weight, followed by applying the powders onto the alumina particles.

In the case where a water-soluble or organic solvent-soluble titanium compound is coated on the surface of the alumina particles, a solvent is preferably used in such an amount that the surface of the alumina particles is just wetted, e.g., 5 to 20% by weight, and the alumina particles are mixed with the titanium compound solution.

After the titanium-containing compound is applied onto the alumina particles, the particles are dried to remove the water or solvent, if any. After the drying, the solvent is evaporated and titanate, titanium hydroxide or the like remains on the surfaces of the alumina particles. If the amount of the solvent is high, the solute may move during the drying process to result in non-uniform distribution of the compound on the surface of the alumina particles, or the alumina particles may be aggregated with each other with the compound therebetween. In this case, if the amount of the compound is not high, the aggregation is relatively rare, but if the amount of the compound is high, dissociation of the aggregation of the alumina particles may result in removal of the compound from the alumina particles or non-uniform distribution of the compound on the surfaces of the alumina particles.

If a relatively large amount of the solvent is required, it is therefore preferred that a rotary or fluidized dryer is used in order to prevent the aggromeration or the movement of the solute during the drying.

The drying after the application of the compound is preferably conducted at a temperature of 40° to 90° C., more preferably at a relatively low temperature in said range for a longer time. If the temperature is above 90° C., the water is completely removed after the drying step and the applied compound is disadvantageously separated from the alumina particles. The time for drying is preferably 10 to 20 hours.

Then, the dried sample is put in a crucible such as alumina crucible and heated, for example, in an electric furnace, so as to react the titanium-containing compound with the alumina. As a result, the surfaces of the fused alumina particles is covered with a coating layer of aluminum titanate.

It is preferred that the heating is conducted at a temperature in a range from 1,200° C. to the melting point of aluminum titanate, i.e., 1,860° C., more preferably 10 1,400° to 1,700° C. The aluminum titanate is formed at a temperature above about 1,200° C., but a temperature of 1,400° C. or higher is preferable since a lower temperature requires a longer heating time. A temperature of 1,700° C. or lower is preferable since a temperature close to the melting point of aluminum titanate may result in sintering of the particles. The time period for heating at 1,400° C. is preferably 30 minutes or more and at 1,700° C. it may be as short as 5 minutes.

Thus, fused alumina particles covered with a coating layer of aluminum titanate are obtained.

The thus coated fused alumina particles have a coating layer of aluminum titanate with a thickness of about 10 to 20 μm. The titanium compound was entirely converted to aluminum titanate, and no other titanium compound was detected by X-ray diffraction. No titanium was found at a depth exceeding 25 μm from the surface of the particle. The aluminum titanate covering the surfaces of the alumina particles is a low temperature type aluminum titanate, β-alumium titanate.

The coated fused alumina particles of the present invention are harder than the corresponding non-coated fused alumina particles and have a Vickers hardness of 2,100 kg/mm$^2$ or more while non-coated fused alumina has a Vickers hardness of less than 2,100 kg/mm$^2$.

After the heat treatment at 1,200° C. or higher, the coated fused alumina particles are cooled to room temperature and screened with a sieve or the like to obtain a predetermined grain size of the abrasive grit. Thus, the abrasive grits having a desired grain size are obtained.

The abrasive grits in general have a grain size as prescribed in JIS R6111-1987 for Artificial Abrasives and JIS R6001-1987 for Abrasive Grain Sizes, but are not limited thereto in the present invention. For example, the abrasive grits of the present invention have a grain size of 3,000 to 20 μm.

The abrasive grits of the present invention may be free abrasive grits or may be used to make grinding wheels and coated abrasives as below.

A grinding wheel is made by shaping and binding (or curing) the abrasive grit with a binder such as a vitrified bond, a metal bond or a resinoid bond. A vitrified bond grinding wheel is preferable. The bond used for a vitrified bond grinding wheel is a so called "frit" and is prepared by mixing feldspar, pottery stone (toseki), borax, clay and the like, and comprises $SiO_2$, $B_2O_3$, $Al_2O_3$, $Fe_2O_3$, CaO, MgO, $Na_2O$, $K_2O$ and so on. A vitrified bond grinding wheel is made by adding a small amount of a glue such as dextrin to the binder as above-mentioned, mixing the abrasive grit with the binder, pressing into a shape, drying and firing the shaped body. The firing temperature is preferably 950° to 1,150° C.

A coated abrasive is made by bonding the abrasive grit onto a backing with an adhesive material. The adhesive material is preferably a phenolic resin-based adhesive material, from the viewpoint of excellent grinding performance and waterproofness, and may be used in combination with resorcinol or a derivative thereof so as to alleviate the curing conditions.

The backing for the coated abrasive may be, for example, paper, woven fabric, and non-woven fabric. A polyester fiber woven fabric is also used in an abrasive belt and so on for heavy-duty work. Non-woven fabrics of a synthetic fiber such as nylon fiber are also used as the backing for the abrasive non-woven fabric.

Among other coated abrasives, JIS (Japanese Industrial Standard) specifies Abrasive Cloths (JIS R6251), Abrasive Papers (JIS R6252), Waterproof Abrasive Papers (JIS R6253), Endless Abrasive Belts (JIS R6254), Abrasive Disc (JIS R6225), Abrasive Belts (JIS R6256) and Cylindrical Abrasive Sleeve (JIS R6257), but the coated abrasives of the present invention are not limited thereto.

An important coated abrasive which is not specified in JIS includes an abrasive non-woven fabric, which is a flexible abrasive material (abrasive cloth) in the form of a non-woven fabric composed of three constituent components of an abrasive grit, a fiber (e.g., nylon or polyester fiber) and an adhesive material. This abrasive non-woven fabric has a three dimensional network structure of randomly oriented and crossed fibers and a large volume of continuous spaces and has a thickness of about 2 to 8 mm, so that it is excellent in flexibility and compression recovery.

EXAMPLES

Example 1

500 g of white fused alumina abrasive (WA produced by Showa Denko K. K.) with a grain size of #60 was charged in a tray of SUS304. The grain size of #60 is defined as 350 to 210 μm. 1.25 g of anatase-type $TiO_2$ powder (Ishihara Sangyo K. K., A-100; average particle size of 0.2 μm, 0.25% by weight as $TiO_2$ to 100% by weight of alumina) was dispersed in 50 ml of distilled water. The resultant 2.44 wt %-dispersion was added to and mixed with said abrasive in said tray while stirring, so as to apply the $TiO_2$ powder to the abrasive particles.

Then, the particles were dried in a fan drier at 60° C. for 16 hours to reduce the remaining water content to 2.3% by weight.

The powder-applied abrasive was transferred to an aluminum crucible and heated in a muffle furnace up to 1,500° C. in 7 hours and kept at 1,500° C. for 10 hours, followed by allowing to cool in the furnace. When the temperature in the furnace reached room temperature, the abrasive was screened with a sieve of 350 to 210 μm so as to remove aggregated coarse grains and unreacted $TiO_2$ powders. Thus, abrasive particles with a grain size of #60 were obtained.

This abrasive had a density of 3.98 g/cm$^3$ and a Vickers hardness of 2,130 kg/mm$^2$ under a load of 500 g.

The abrasive was analyzed by X-ray diffraction and it was found that only aluminum titanate was formed on the surface of the abrasive.

The toughness of the abrasive was measured in accordance with a method defined as the C coefficient in JIS R1628-1975 (Ball Mill Test for Toughness of Artificial Abrasive). Namely, about 250 g of a sample is screened with sets of standard sieves as defined in JIS R6001-1987 in a ro-tap shaker for 10 minutes. The abrasive left on the third sieve is again screened with the standard sieves for 10 minutes. The abrasive then left on the third sieve in an amount of 100 g is selected as the sample to be tested. This sample is milled in a ball mill in the manner as defined in JIS R6128-1975. The crashed sample is screened with sets of standard sieves for 5 minutes and the abrasive left on the fourth sieve is weighed and designated as R(X). Also, the same procedure is repeated using as the standard sample #60 black silicon carbide abrasive as defined in JIS R6128-1975, and the weight of the sample left on the fourth sieve after milling in ball mill is designated as R(S). The C coefficient is calculated by the following formula:

$$C \text{ coefficient} = \frac{\log [100/R(X)]}{\log [100/R(S)]}$$

The toughness is higher as the above value of the C coefficient is lower.

The C coefficient of the abrasive in Example 1 was 0.77.

Example 2

Example 1 was repeated except that the amount of the $TiO_2$ powder was 5.1 g (1.0% by weight as $TiO_2$ to 100% by weight of alumina).

The thus obtained abrasive had a density of 3.98 g/cm$^3$ and a Vickers hardness of 2,160 kg/mm$^2$ at a load of 500 g. The C coefficient was 0.79. X-ray diffraction revealed that only aluminum titanate was formed on the surface of the abrasive.

Example 3

8.9 g of titanium tetraisopropoxide (produced by Wako Junyaku, 0.5% by weight of $TiO_2$ to 100% by weight of alumina) was charged in a tray which contained the same abrasive in the same amount as in Example 1, followed by stirring and then adding and mixing 50 ml of isopropylalcohol thereto, to thereby applying the titanium tetraisopropoxide onto the surface of the abrasive. The mixture in which the titanium tetraisopropoxide is applied onto the abrasive was heated on a hot plate to evaporate all the alcohol while stirring.

After the drying, the abrasive was transferred into an alumina crucible and heated in a muffle furnace to 1,400° C over a period of 7 hours and kept at 1,400° C. for 2 hours, and then allowed to cool in the furnace. After the abrasive was cooled to room temperature, the abrasive was screened with 350 to 210 μm sieves to obtain #60 abrasive as in Example 1.

The obtained abrasive had a density of 3.98 g/cm$^3$ and a Vickers hardness of 2,180 kg/mm$^2$ under a load of 500 g. The C coefficient was 0.76.

The surface of the abrasive was qualitatively analyzed by X-ray diffraction and it was revealed that only aluminum titanate was formed.

Example 4

Example 3 was repeated but 9.8 g of aqueous solution of titanium tetrachloride (produced by Showa Titanium K. K.; Ti content of 15.4% by weight, 0.5% by weight of $TiO_2$ to 100% by weight of alumina) was dissolved in 50 ml of water.

The thus obtained abrasive had a density of 3.98 g/cm$^3$, a Vickers hardness of 2,130 kg/mm$^2$ and a C coefficient of 0.75.

X-ray diffraction revealed that only aluminum titanate was formed on the surface of the abrasive.

Example 5

Example 1 was repeated, but 83.1 g of a 3.02 wt % aqueous dispersion of the $NiTiO_3$ powder (0.26% by weight as $TiO_2$ to 100% by weight of alumina) was mixed with the abrasive. The $TiNiO_3$ powder was prepared by coprecipitate method. Titanium tetrachloride and nickel tetrachloride were coprecipitated by neutralization with sodium hydroxide. The coprecipitate was heated in the presense of sodium chloride to 800° C. to desalt, followed by crushing and centrifugal treatment to obtain a fine powder of $NiTiO_3$ or $NiO \cdot TiO_2$ (average particle size of 0.058 μm). 83.1 g of a 3.02 wt % aqueous dispersion of the $NiTiO_3$ powder (0.26% by weight as $TiO_2$ to 100% by weight of alumina) was mixed with the abrasive.

The thus obtained abrasive had a density of 3.99 g/cm$^3$, a Vickers hardness of 2,190 kg/mm$^2$ and a C coefficient of 0.75.

The surface of the abrasive was qualitatively analyzed by X-ray diffraction and was found to consist of aluminum titanate and nickel oxide-alumina spinel.

Comparative Examples 1 to 2

60 abrasive particles of white fused alumina (WA) and single crystalline fused alumina (SA), both produced by Showa Denko K. K., were examined for their density, hardness and C coefficient.

TABLE 1

| Sample (#60) | Density (g/cm$^2$) | Vickers hardness under load of 500 g (kg/mm$^2$) | C coefficient |
| --- | --- | --- | --- |
| WA | 3.94 | 2,050 | 1.10 |
| SA | 3.95 | 2,020 | 0.92 |

Comparative Example 3

This was a follow-up examination of JP-B-40-16594.

500g of #60-WA abrasive as in Example 1 was mixed with a 5 wt %-aqueous solution of chromic acid anhydride ($CrO_3$) in an amount of 0.5% by weight as $CrO_3$ to apply the chromium trioxide onto the surface of the abrasive, which was then heated at 1,200° C. for 2 hours to form a coating layer of chromium oxide on the surface of the abrasive.

This abrasive was examined and found to have a density of 3.96 g/cm$^3$ a Vickers hardness of 2,070 kg/mm$^2$ and a C coefficient of 1.05.

Comparative Example 4

This was a follow-up examination of JP-B-44-638.

60 WA as in Comparative example 3 was mixed with an aqueous nickel nitrate solution in an amount of 0.5% by weight of nickel nitrate, which was dried and heated at 900° C. for 2 hours to obtain abrasive having a layer of nickel oxide on the surface thereof.

The obtained abrasive had a density of 3.95 g/cm$^3$, a Vickers hardness of 2,040 kg/mm$^2$ and a C coefficient of 1.09.

Examples 6 to 10 and Comparative Examples 5 to 8

100 parts by weight of each of the #60 abrasives of Examples 1 to 5 and Comparative examples 1 to 4 were mixed with 13 parts by weight of borosilicate frit, 2 parts by weight of dextrin and 2.5 part by weight of water, as a bond for a vitrified grinding wheel, in a mixer. The borosilicate frit contains 70% of $SiO_2$, 7% of $Al_2O_3$, 18% of $B_2O_3$, 4% of ($Na_2O+K_2O$) and 0.5% of ($CaO+MgO$), by weight.

The mixture was pressed into the shape, the obtained shaped body containing 45% of the abrasive. The shaped body was dried at 110° C. for 20 hours and then heated at 1,050° C. for 20 hours. A slow cooling was effected, in which the temperature fell at 1° C. min or less particularly between 600° C. to 500° C. Thus, a vitrified grinding wheel having a hardness grade K as specified in JIS R6210 was obtained.

All the grinding wheels had an outer diameter of 200 mm, an inner diameter of 50.8 mm and a thickness of 19 mm.

Examples 11 to 15 and Comparative Examples 9 to 12

The grinding performances of the vitrified grinding wheels of Examples 6 to 10 and Comparative examples 5 to 8 were examined under the following conditions.

Machine: Okamoto Surface Grinder PSG-52DX (3.7 kW)
Grinding Mode: Plunge grinding, down cut, manual infeeding
Work piece: SUJ-2 ($H_{RC}60$), 100 mmL×50 mm H×10 mmT
Wheel Peripheral Speed: 2,000 m/min
Table Speed: 20 m/min
Infeed Speed: ΔR 20 μm/pass
Total Depth Setting: 5 mm
Grinding Width: 10 mm
Spark out: 1
Grinding Oil: Noritake Cool K-82B (water soluble grinding oil)
Dressing Conditions: Monolithic diamond dresser,
  Infeed: ΔR 20 μm/pass
  Lead: 0.2 mm/rev. of wheel
  Spark out: non The results of the grinding performances, maximum power consumption (value by deducting no load power (0.4 kW)) and surface roughness of the work pieces are shown in Table 2.

TABLE 2

| Sample | Abrasive | G-ratio (mm$^3$/mm$^3$) | Max power consumption (kW/cm) | Surface roughness (μmRz) |
| --- | --- | --- | --- | --- |
| Ex. 11 | Ex. 1 | 55 | 1.6 | 9 |
| Ex. 12 | Ex. 2 | 60 | 1.6 | 8 |
| Ex. 13 | Ex. 3 | 62 | 1.5 | 10 |
| Ex. 14 | Ex. 4 | 68 | 1.7 | 8 |
| Ex. 15 | Ex. 5 | 61 | 1.5 | 9 |
| Com. ex. 9 | Com. ex. 1 | 30 | 2.1 | 11 |
| Com. ex. 10 | Com. ex. 2 | 36 | 1.9 | 10 |
| Com. ex. 11 | Com. ex. 3 | 39 | 1.9 | 9 |
| Com. ex. 12 | Com. ex. 4 | 33 | 2.0 | 11 |

As shown in Table 2, when the abrasives of the present invention were used in the grinding wheels, the grinding wheels had grinding ratios significantly higher than the grinding wheel with commercial WA abrasive (about 2 times), the grinding wheel with SA abrasive (about 1.7 times), the grinding wheel with abrasive coated with chromic acid of Comparative example 3 (about 1.5 times), and the grinding wheel with the abrasive coated with nickel oxide of Comparative example 4 (about 1.8 times). Although the grinding ratios of Examples 11 to 13 are excellent in comparison with Comparative examples 9 to 12, the maximum power consumptions of Examples are lower than those of Comparative examples and are also excellent in the surface roughness value than Comparative examples.

Example 16

An abrasive was prepared in the same procedures as in Example 1 except that the starting abrasive was disassociated-type alumina abrasive containing 0.30% by weight of $TiO_2$ (Showa Denko K. K., SA).

The obtained abrasive had a density of 3.98 g/cm$^3$, a Vickers hardness of 2,210 kg/mm$^2$ and a C coefficient of 0.69. Only aluminum titanate was found on the surface of the abrasive, when an X-ray diffraction analysis was conducted.

Using this abrasive, a grinding wheel was made in the same manner as in Examples 6 to 10 and examined for grinding performance in the manner as in Examples 11 to 15.

As a result, the grinding ratio was 78 mm$^3$/mm$^3$, the maximum power consumption was 1.5 kW/cm and the surface roughness was 8 μmRz.

Example 17

An abrasive was prepared in the same procedures as in Example 1, except that Bayer's alumina was mixed with 0.7% by weight of titanium oxide, fused and solidified in an arc furnace, and crushed and screened to obtain #60 abrasive. After $TiO_2$ powder was applied to the surface of this abrasive, the particles were heated at 1,400° C. for 5 hours.

The thus obtained abrasive had a density of 3.97 g/cm$^3$, a Vickers hardness of 2,150 kg/mm$^2$ and a C coefficient of 0.70. X-ray diffraction revealed that only aluminum titanate was formed on the surface of the abrasive.

Comparative Example 13

500 g of #60 brown fused alumina abrasive (Showa Denko K. K., A-40) was mixed with a dispersion of 13 g of anatase-tape $TiO_2$ powder (Ishihara Sangyo K. K., A-100, average particle size of 0.2 μm) in 100 ml of distilled water, and mixed with stirring so as to apply the $TiO_2$ powder to the surface of the abrasive. After the application, the abrasive was dried at 60° C. for 20 hours in a fan drier to leave 2.8% by weight of water.

The abrasive was transferred into an alumina crucible, and heated in a muffle furnace up to 1,400° C. in 6 hours and kept at 1,400° C. for 3 hours.

The thus obtained abrasive had a density of 3.98 g/cm$^3$, a Vickers hardness of 2,020 kg/mm$^2$ under a load of 500 g, and the C coefficient of 1.10. These values were not different from those obtained before the treatment, i.e., a density of 3.98 g/cm$^3$, a hardness of 2,010 kg/mm$^2$ and a C coefficient of 1.10.

X-ray diffraction showed that the abrasive had a coating predominantly of titanium oxide with a minor amount of aluminum titanate. The reason why the abrasive did not have improved properties even after titanium oxide was applied on the surface thereof and heated, is thought to be because the surface of the abrasive was coated with a glassy phase formed from a considerable amount of impurities in addition to aluminum titanate due to a considerable amount of impurities such as titanium oxide, silica and iron oxide eluted from the inside of the abrasive.

In accordance with the present invention, the fused alumina particle covered with a coating of aluminum titanate involves a chemical bonding between the coating layer and the alumina particle so that the coating layer is not peeled off. Accordingly, when this particle is used as an abrasive material, the grinding performance is improved in comparison with conventional abrasives.

We claim:

1. Coated fused alumina particles in which fused alumina particles are covered with a coating comprising aluminum titanate as a major component wherein the coated fused alumina particles are formed by adding a titanium-containing compound containing an amount of 0.03 to 3.0 parts by weight of titanium dioxide per 100 parts by weight of said fused alumina particles to said fused alumina particles.

2. Coated fused alumina particles according to claim 1 wherein said coating comprising aluminum titanate and an alumina compound.

3. Coated fused alumina particles according to claim 2 wherein said compound is a spinel.

4. Coated fused alumina particles according to claim 2 wherein said coating does not contain unreacted titanium dioxide.

5. Coated fused alumina particles according to claim 1 wherein said coating does not contain unreacted titanium dioxide.

6. Coated fused alumina particles according to claim 1 wherein said coating consists essentially of alumina titanate.

7. Coated fused alumina particles according to claim 1 wherein said coating layer has a thickness of 10 to 20 μm.

8. Coated fused alumina particles according to claim 1 wherein the coated fused alumina particles have a Vickers hardness of more than 2,100 kg/mm$_2$.

9. Coated fused alumina particles according to claim 1 wherein said aluminum titanate is β-aluminum titanate.

10. Coated fused alumina particles according to claim 1 wherein the coated fused alumina particles have a particle size of 3,000 to 20 μm.

11. An abrasive grit comprising the coated fused alumina particles according to claim 1.

12. A grinding wheel comprising abrasive grit according to claim 11.

13. A coated abrasive comprising abrasive grit according to claim 11.

* * * * *